Patented Oct. 10, 1944

2,360,210

UNITED STATES PATENT OFFICE 2,360,210

MIXED CARBOXYLIC-CARBAMIC ANHYDRIDES

Joseph B. Dickey and James M. Straley, Rochester, N. Y., assignors to Eastman Kodak Company, Rochester, N. Y., a corporation of New Jersey No Drawing. Application February 28, 1942, Serial No. 432,905

5 Claims. (Cl. 260—546)

This invention relates to mixed anhydrides and more particularly to carboxylic-carbamic anhydrides and to a process for preparing the same.

It is known that aliphatic carboxylic acids will react with organic isocyanates to produce N-alkyl amides and carbon dioxide. We have now found that carboxylic acids react with diisocyanates to produce not simple bis amides, but rather mixed carboxylic-carbamic anhydrides. These mixed anhydrides react with water to yield diamines, thereby providing a process for obtaining amino compounds which are useful in the preparation of water-repelling agents and in the preparation of polyurea and polyamide resins. On the other hand, these mixed anhydrides react with alcohols to give bis urethanes.

It is, accordingly, an object of our invention to provide mixed carboxylic-carbamic anhydrides. A further object is to provide a process for preparing the same. A further object is to provide a process for preparing diamines. A still further object is to provide bis urethanes and a process for preparing the same. Other objects will become apparent hereinafter.

In accordance with our invention, we prepare our mixed carboxylic-carbamic anhydrides by treating a diisocyanate with a carboxylic acid. The reaction can be performed in an inert medium such as a hydrocarbon medium, e. g. benzene, but the use of such a medium is not necessary.

Exemplary of the diisocyanates which we employ in practicing our invention are the following:

OCN—CH₂—CH₂—CH₂—NCO
OCN—(CH₂)₄—NCO
OCN—(CH₂)₅—NCO
OCN—(CH₂)₆—NCO
OCN—(CH₂)₇—NCO
OCN—(CH₂)₈—NCO
OCN—CH₂—CH₂—O—CH₂—CH₂—NCO

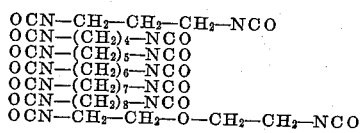

OCN—CH₂—CH₂—S—CH₂—CH₂—NCO

OCN—CH₂—CH₂—S—CH₂—CH₂—NCO
              ||
              O

OCN—CH₂—CH₂—S—CH₂—CH₂—NCO
             //  \\
            O     O

OCN—CH₂—O—Q—O—CH₂—NCO (where Q represents a divalent organic radical, e. g. tetramethylene)

The diisocyanate can be used in statu nascendi by decomposing the corresponding diazide in the presence of the carboxylic acid.

Exemplary of the carboxylic acids which we employ in practicing our invention are acetic and propionic acids. An excess of the carboxylic acid, e. g. at least four molecular proportions for each molecular proportion of diisocyanate, is advantageously employed.

The following examples will serve to illustrate our mixed carboxylic-carbamic anhydrides and the process of obtaining the same, as well as the formation of diamines and bis urethanes therefrom. The parts are by weight.

*Example 1.—Mixed anhydride of tetramethylene bis carbamic acid and acetic acid*

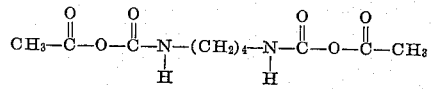

10 parts of tetramethylene diisocyanate and 20 parts of glacial acetic acid were mixed and cooled to 10° C. In a few minutes, white crystals formed. These were filtered off. 12 parts of the mixed anhydride were thus obtained, melting at 65° to 66° C. with decomposition.

*Example 2.—Mixed anhydride of octamethylene bis carbamic acid and propionic acid*

196 parts of octamethylene diisocyanate were mixed with 500 parts of propionic acid and cooled to 10° C. White crystals of the mixed anhydride formed and were filtered off. 250 to 260 parts of the mixed anhydride were thus obtained, melting at 68° to 69° C. with decomposition.

*Example 3.—Mixed anhydride of octamethylene bis carbamic acid and acetic acid*

392 parts of octamethylene diisocyanate and 1500 parts of glacial acetic acid were dissolved in 2000 parts of dry benzene and the resulting mixture was allowed to stand at 10° C. for 48 hours. The white crystals which formed were filtered off. In this manner, 480 to 505 parts of the mixed anhydride were obtained, decomposing at 79° to 80° C.

*Example 4.—Octamethylene diamine*

258 parts of the mixed anhydride of octamethylene bis carbamic acid and acetic acid (Example 3) were refluxed 4 hours with 1000 parts of 20% hydrochloric acid. The resulting solution was distilled to complete dryness and made alkaline with solid sodium hydroxide. The mixture was then extracted well with diisopropyl ether or benzene and the extract distilled in vacuo.

There were thus obtained 100 to 120 parts of octamethylene diamine boiling at 120 to 130° C. at 8 mm. of mercury pressure and melting at 51 to 52° C.

*Example 5.—Mixed anhydride of octamethylene bis carbamic acid and acetic acid and hydrolysis thereof*

Sebacic diazide was prepared in known manner from 230 parts of sebacic dihydrazide, 140 parts of sodium nitrite and 172 parts of muriatic acid. The filtered diazide was added in small portions to 200 cc. of acetic acid, heated to 55° to 60° C., cooling intermittently. After nitrogen evolution was complete, the acetic acid was removed in vacuo on a steam plate. The residue was then hydrolyzed as in Example 4. The yield was 110 to 130 parts of octamethylene diamine.

*Example 6.—Octamethylene bis ethyl carbamate*

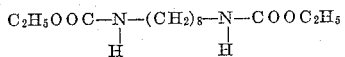

150 parts of the mixed anhydride of octamethylene bis carbamic acid and acetic acid (Example 3) were refluxed for 2 hours in 1000 parts of ethyl alcohol. The alcohol was removed by vacuum distillation and the urethane recrystallized from dilute alcohol. In this manner 100 to 135 parts of the urethane, melting at 80° to 81° C. were obtained.

*Example 7.—Mixed anhydride of heptamethylene bis carbamic acid and acetic acid and hydrolysis thereof*

158 parts of azelaic hydrazide were converted to the diazide in known manner using 76 parts of sodium nitrite and 100 parts of muriatic acid. The diazide was extracted with benzene and the benzene solution was heated at 60 to 65° C. until no more nitrogen was evolved. The benzene was then removed in vacuo on the steam bath and the warm residue was poured into twice its volume of acetic acid. The acetic acid solution was then treated as in Example 5. In this manner 42 parts of heptamethylene diamine boiling at 94° to 95° C. at 5 mm. of mercury pressure.

Our new mixed carboxylic-carbamic anhydrides can be represented by the following general formula

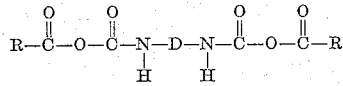

wherein D represents a divalent organic radical, the terminal carbon atoms of which do not lie in an aromatic nucleus, e. g. trimethylene, octamethylene,

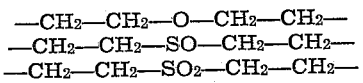

or

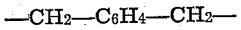

and R represents a monovalent organic radical of the formula $C_mH_{2m+1}$, wherein $m$ represents a positive integer of from 1 to 2.

What we claim as our invention and desire to be secured by Letters Patent of the United States:

1. A carboxylic-carbamic anhydride of the following general formula:

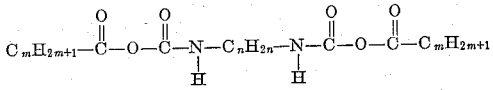

wherein $m$ represents a positive of from 1 to 2 and $n$ represents a positive integer of from 2 to 8.

2. A carboxylic-carbamic anhydride of the following formula:

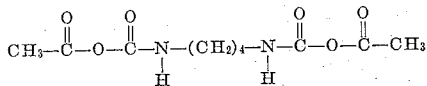

3. A carboxylic-carbamic anhydride of the following formula:

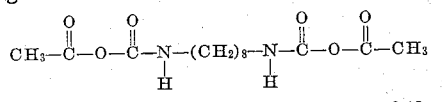

4. A carboxylic-carbamic anhydride of the following formula:

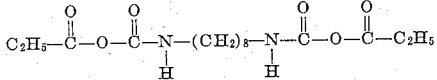

5. A process for preparing a carboxylic-carbamic anhydride comprising mixing in cooled liquid phase at a temperature of not more than 10° C., one molecular proportion of an organic diisocyanate of the following general formula:

wherein $n$ represents a positive integer of from 2 to 8, with at least four molecular proportions of carboxylic acid of the following general formula:

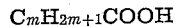

wherein $m$ represents a positive integer of from 1 to 2.

JOSEPH B. DICKEY.
JAMES M. STRALEY.